United States Patent
Larsen et al.

(10) Patent No.: US 8,411,037 B2
(45) Date of Patent: Apr. 2, 2013

(54) KEYBOARD WITH TOUCH SENSITIVE ZONES AND CORRESPONDING COMPUTER USER INTERFACE

(75) Inventors: Glen C. Larsen, Issaquah, WA (US); Daniel G. O'Neil, Seattle, WA (US); Scott M. Mail, Seattle, WA (US); David M. Lane, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 11/818,432

(22) Filed: Jun. 14, 2007

(65) Prior Publication Data
US 2008/0309522 A1    Dec. 18, 2008

(51) Int. Cl.
  *G06F 3/02*    (2006.01)
  *G09G 5/00*    (2006.01)
(52) U.S. Cl. ....................................................... 345/168
(58) Field of Classification Search .................. 345/168, 345/170; 341/34; 361/679
  See application file for complete search history.

(56) References Cited

U.S. PATENT DOCUMENTS

| | | | | |
|---|---|---|---|---|
| 4,582,967 A * | 4/1986 | Brumit et al. | | 200/5 A |
| 5,341,133 A | 8/1994 | Savoy et al. | | 341/22 |
| 5,463,388 A | 10/1995 | Boie et al. | | 341/33 |
| 5,525,980 A | 6/1996 | Jahier et al. | | 341/33 |
| 5,666,113 A | 9/1997 | Logan | | 341/34 |
| 5,703,625 A * | 12/1997 | Snider et al. | | 345/168 |
| 6,181,262 B1 | 1/2001 | Bennett | | 341/26 |
| 6,535,200 B2 * | 3/2003 | Philipp | | 345/168 |
| 6,993,607 B2 | 1/2006 | Philipp | | 710/67 |
| 7,499,040 B2 * | 3/2009 | Zadesky et al. | | 345/204 |
| 2003/0122779 A1 | 7/2003 | Martin et al. | | 345/156 |
| 2005/0110762 A1 * | 5/2005 | Muyskens et al. | | 345/170 |
| 2006/0256090 A1 | 11/2006 | Huppi | | 345/173 |

OTHER PUBLICATIONS

Katherine Boehret "Interface with Pre-Typing Visual Feedback for Touch-Sensitive Keyboard" http://solution.allthingsd.com/20070516/beyond-the-standard-issue-keyboard/ pp. 1-10.
"Beyond the Standard-Issue Keyboard" CHI 2003, Apr. 5-10, 2003, Ft. Lauderdale, FL, USA ACM 1-58113-637-4/03/0004.
"Integra Touch-Sensitive Keyboard" Commac Automatic Audiovisuelle, Article Reference No. 004C80 1 page.

* cited by examiner

*Primary Examiner* — Quan-Zhen Wang
*Assistant Examiner* — Nelson D Runkle, III
(74) *Attorney, Agent, or Firm* — Westman, Champlin & Kelly, P.A.

(57) ABSTRACT

A keyboard key has a key portion that forms a cantilevered beam pivotable about an axis. A switch is disposed relative to the cantilevered beam, such that rotation of the cantilever beam about the axis causes depression of the switch. The switch is offset from an applied force-receiving portion of the key portion. A touch sensitive key also includes a touch sensor detecting contact with the key portion of the key. The invention can be extended such that the key portion is formed of transparent or semi-transparent material. The invention can also be extended to include touch sensitive areas on any portion of an upper case of the computer keyboard.

19 Claims, 11 Drawing Sheets

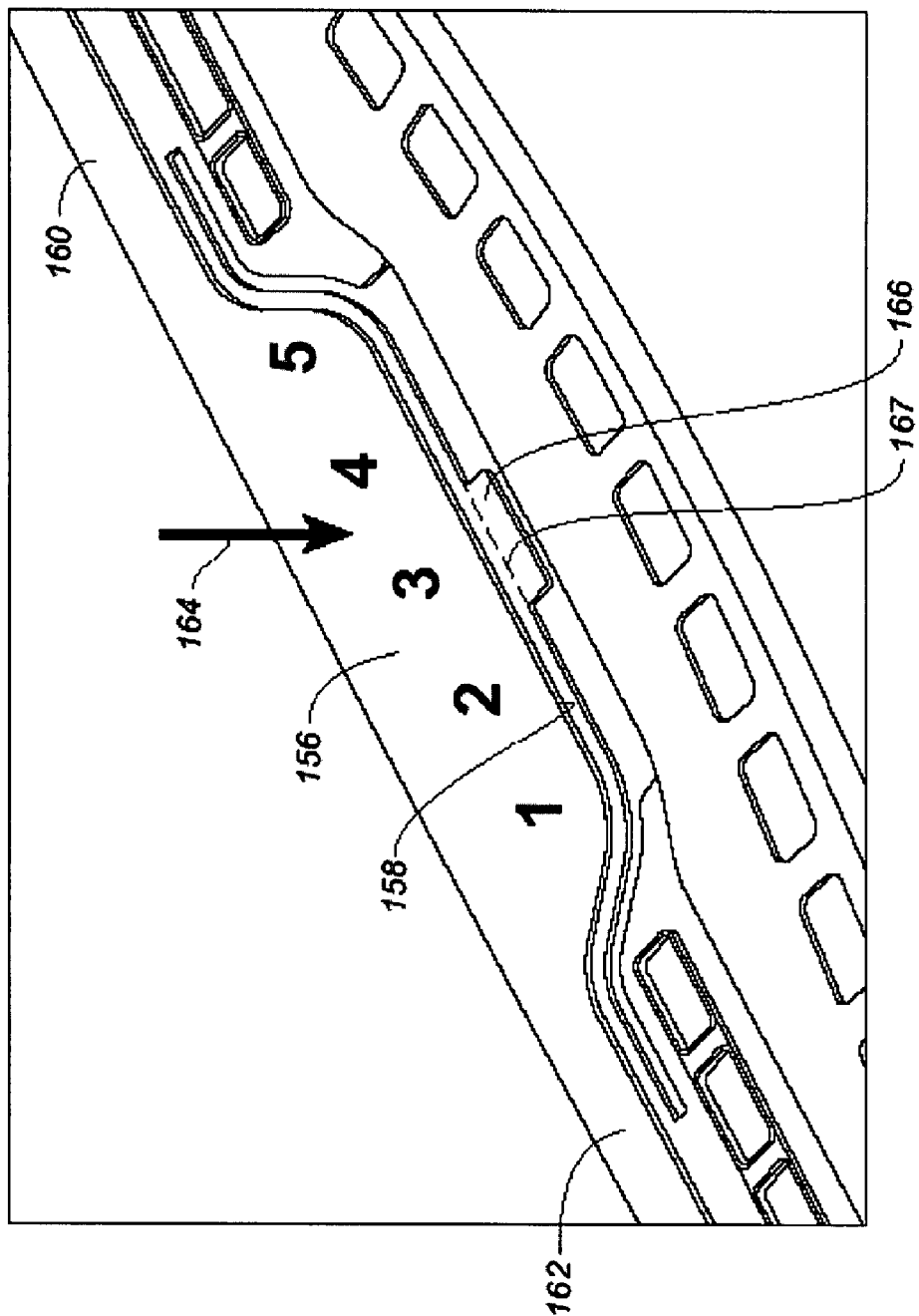

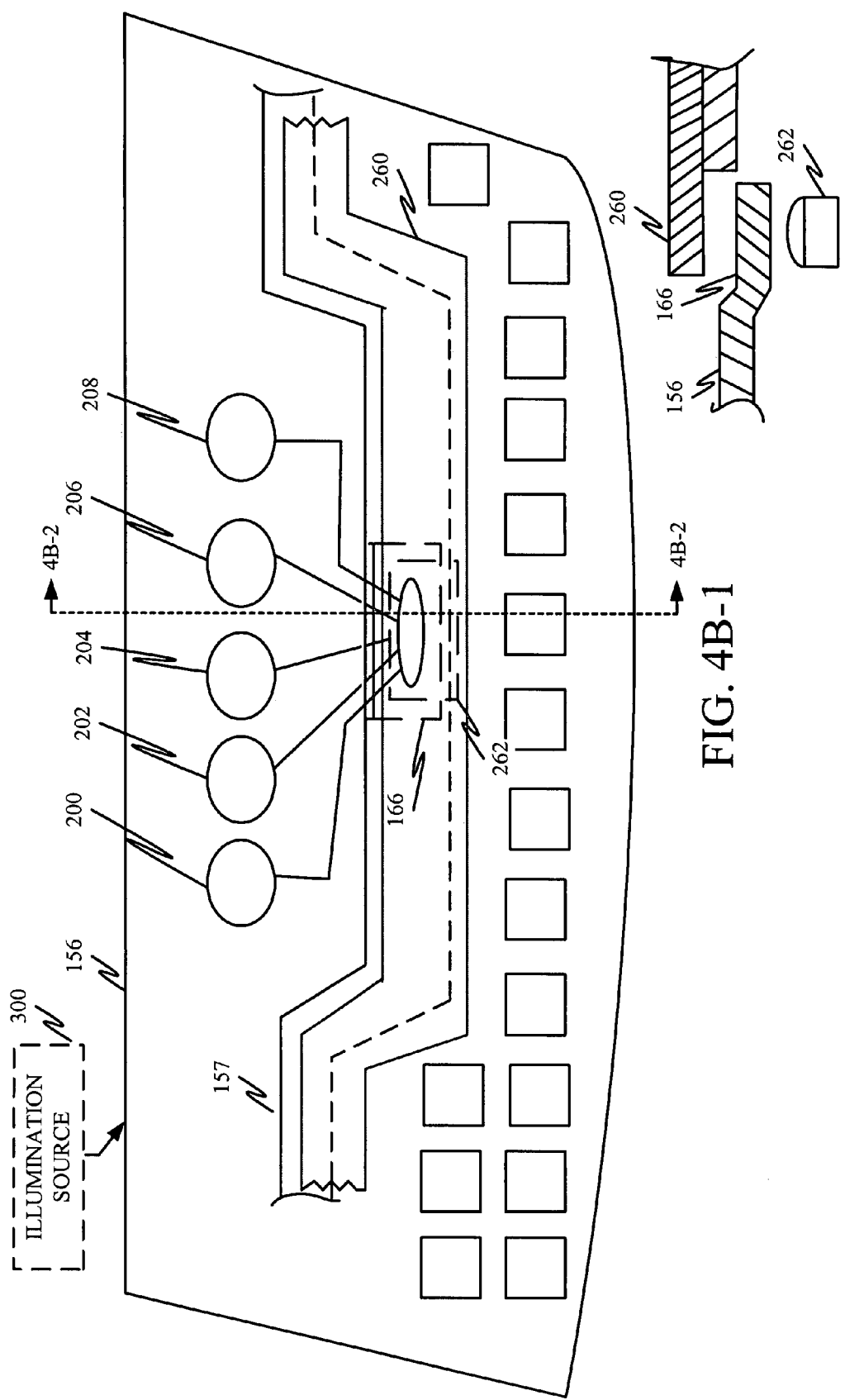

KEYBOARD WITH TOUCH SENSITIVE ZONES AND CORRESPONDING COMPUTER USER INTERFACE

BACKGROUND

Currently, there are a wide variety of different types of user input devices that are used with computers. Among them, computer keyboards are in wide use. Computer keyboards typically include a plurality of depressible keys. Each key usually incorporates an electrical or mechanical switch which signals key activation when the corresponding key is depressed.

In some current keyboards, these switches are implemented as packaged metal domes that are soldered to a printed circuit board. In other current embodiments they are elastomeric domes contacting traces on Mylar sheets.

In either case, it has been found that most users believe it is undesirable to have a keyboard manufactured such that the user can actually see the switch mechanism. This forces the key designs to be opaque in order to hide the actual switch mechanism, or at least to be dark translucent. However, some current industrial designers often desire computer input devices to have very clean lines and have at least the outer shells of the computer input devices be formed of transparent materials.

Capacitive touch sensing technology has been used in keyboards in the past. However this has been, by and large, limited to touch pads for tracking two dimensional movement, like cursor control. Such current capacitive keypad solutions do not provide tactile feedback, which can be very helpful in notifying the user that a selection event has actually occurred.

The discussion above is merely provided for general background information and is not intended to be used as an aid in determining the scope of the claimed subject matter.

SUMMARY

A keyboard key has a key outer portion that forms a cantilevered beam pivotable about an axis. A switch is disposed relative to the cantilevered beam, such that rotation of the cantilevered beam about the axis causes depression of the switch. The switch is offset from an applied force-receiving portion of the key outer portion. A touch sensitive key also includes a touch sensor detecting contact with the key outer portion of the key. The invention can be extended such that the key outer portion is formed of transparent or semi-transparent material. It could also be formed of opaque material. The invention can also be extended to include touch sensitive areas on any portion of an upper case of the computer keyboard.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is an enlarged pictorial view of one embodiment of a portion of the keyboard shown in FIG. 2.

FIG. 4B-1 and 4B-2 illustrate another embodiment of the touch sensitive areas.

DETAILED DESCRIPTION

Figure 1:
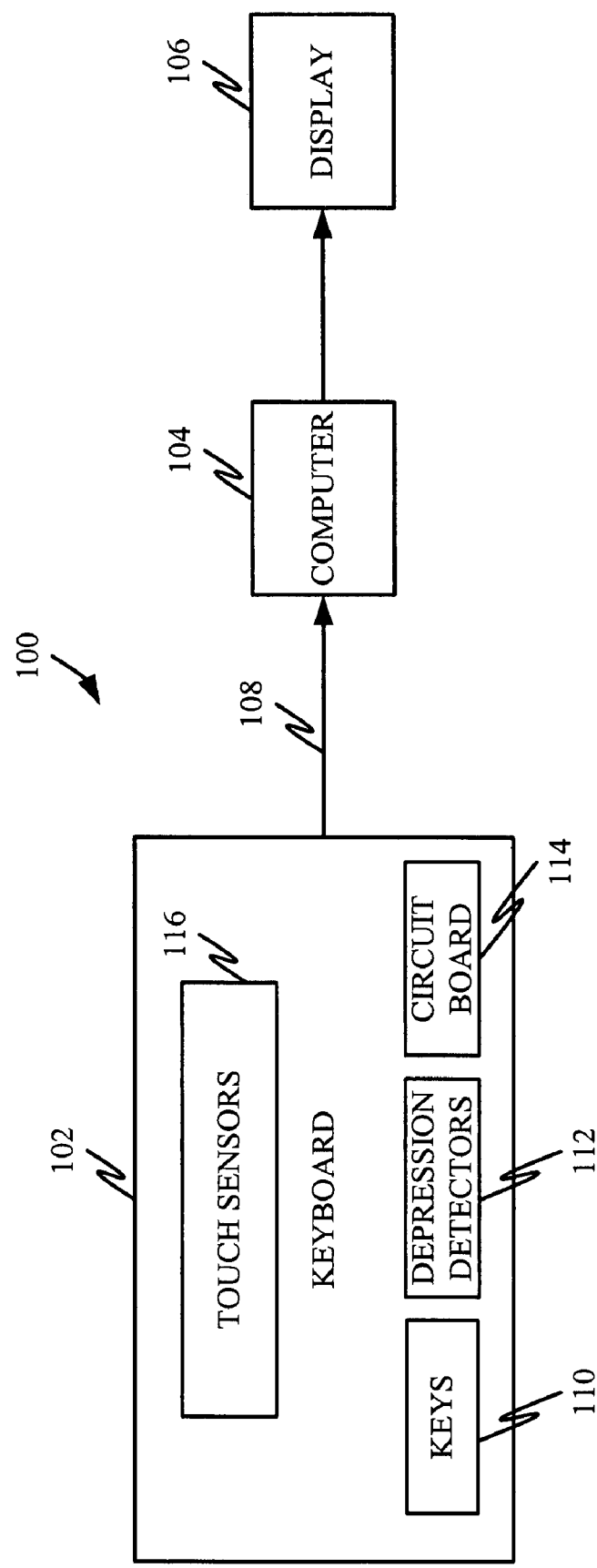
FIG. 1 is a block diagram of one environment in which the invention can be used.

FIG. 1 is a block diagram of a system 100 that includes keyboard 102. Keyboard 102 is shown operably connected to computer 104, that generates a display (or user interface) 106. Keyboard 102 can be connected to computer 104 in a variety of different ways, using connection 108. Connection 108 can be, for instance, a hardwired connection, a wireless connection (such as infrared connection or radio frequency connection) or any other desired connection mechanism.

Keyboard 102 illustratively includes a set of keys 110, a set of key depression detectors 112, such as mechanical switches or electromechanical switches, and a circuit board 114 that has circuitry for processing the key depressions or other user inputs (such as D-pad inputs, joystick inputs, touch sensor inputs, etc.) provided by a user through keyboard 102. Keyboard 102 also illustratively includes touch sensors 116. The touch sensors can be formed in any desired way, such as by using capacitive touch sensor technology, which is generally known. Touch sensors 116 illustratively generate a signal indicating that they are being touched by a user. This is also processed by the circuitry on circuit board 114, as desired.

Figure 2:
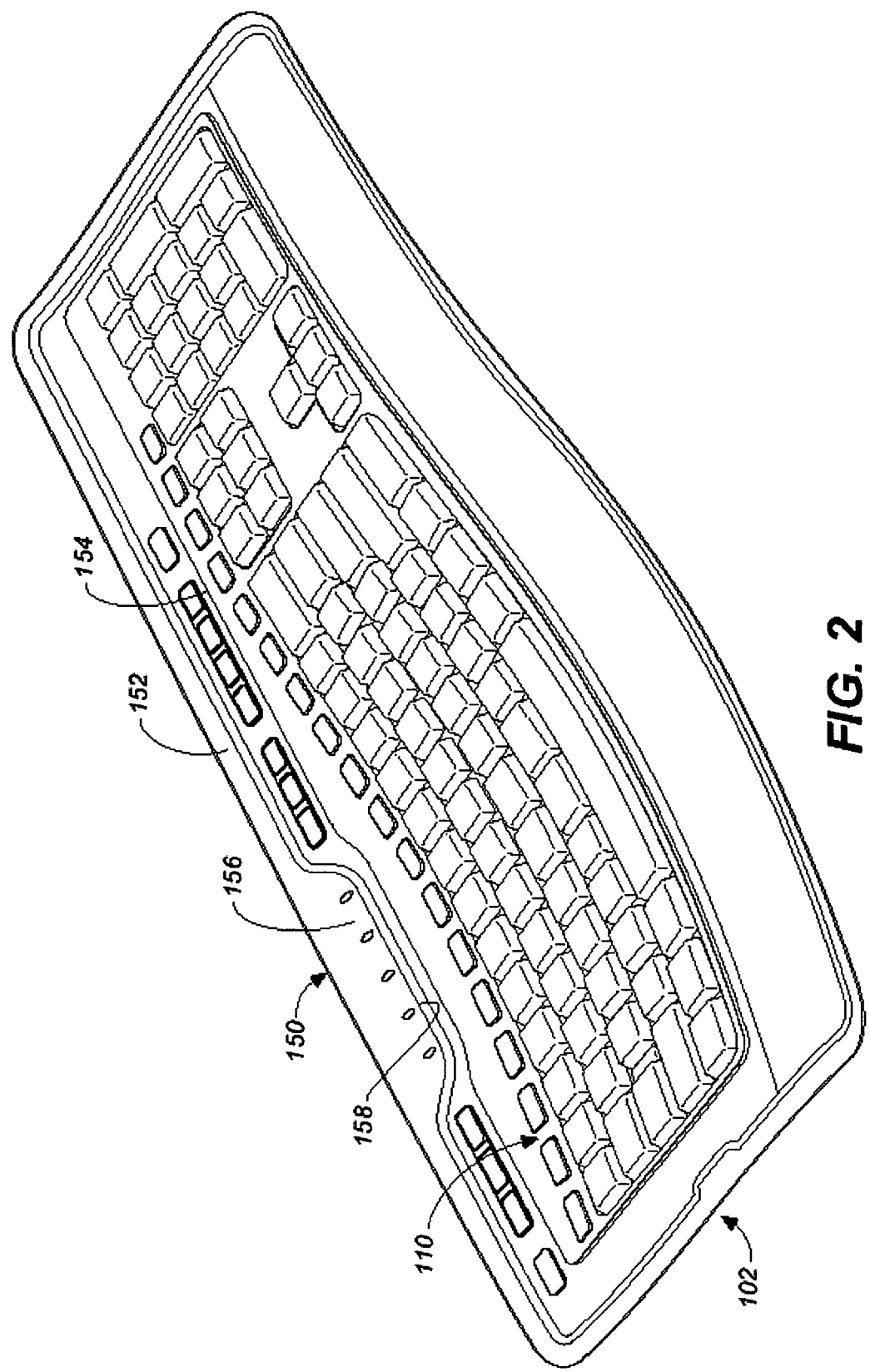
FIG. 2 is a pictorial view of a keyboard in accordance with one embodiment.

FIG. 2 is a pictorial illustration of one embodiment of keyboard 102. In the pictorial illustration shown in FIG. 2, keyboard 102 includes an uppercase 150 that optionally has a transparent (or semi-transparent) rim 152 (but which could be opaque as well) surrounding a plurality of case surface portions 154 that define openings for the various keys 110 that are disposed on keyboard 102. In the embodiment shown in FIG. 2, uppercase 150 of keyboard 102 also includes a keybar 156. An enlarged view of keybar 156 is shown in FIG. 3.

In the embodiment shown in FIG. 3, keybar 156 is formed integrally with the transparent rim 152, of uppercase 150. Keybar 156 has a depression portion 158 that can be pressed, and the depression portion 158 thus pivots downwardly about two pivot regions 160 and 162 when force is applied generally in the direction indicated by arrow 164. Pivoting movement is done by deflection of the uppercase material in the two pivot regions 160 and 162. It will be appreciated that keybar 156 can be a separate piece, separate from uppercase 150, and attached to case 150 with a separate hinge mechanism, or other deflectable or pivotable connection.

It can thus be seen that keybar 156 forms a cantilever structure, the extreme tip of which is a switch activator paddle 166. When pressed in the direction of arrow 164, paddle 166 pivots downward about the pivot points 160 and 162. While any amount of travel can be used, in one embodiment, the amount of travel is quite slight, so that a travel switch which requires only a very small travel distance is needed. In one embodiment, for instance, the travel switch required to detect pivoting deflection of travel bar 156 detects travel of only 0.2 mm. Of course, a wide variety of other travel switches could be used as well.

FIG. 3 also shows that travel bar 156 illustratively has a plurality of touch zones, labeled 1-5. In one embodiment, each touch zone 1-5 has a separate, corresponding touch sensitive region such that, as a user applies force to touch bar 156 in the direction indicated by arrow 164, the placement of the user's finger over one of the touch zones 1-5 can also be detected. In this way, switch bar 156 can act as five separate keys, even though only one electromechanical switch is used. Similarly, the dashed line of 167 in FIG. 3 shows that a portion of actuator paddle 166 could be covered by a ring of trim material, as desired. It should also be noted that the touch zones can be configured to provide tactile feedback so the user can better feel when her/his finger is on one of the touch zones. This can be done by placing tactile feedback at the center of each touch zone, between the touch zones or in another way to help the user locate and distinguish between the touch zones. The tactile feedback can be, for example, surface detail bumps, surface texture variations, etc.

Figure 4A:
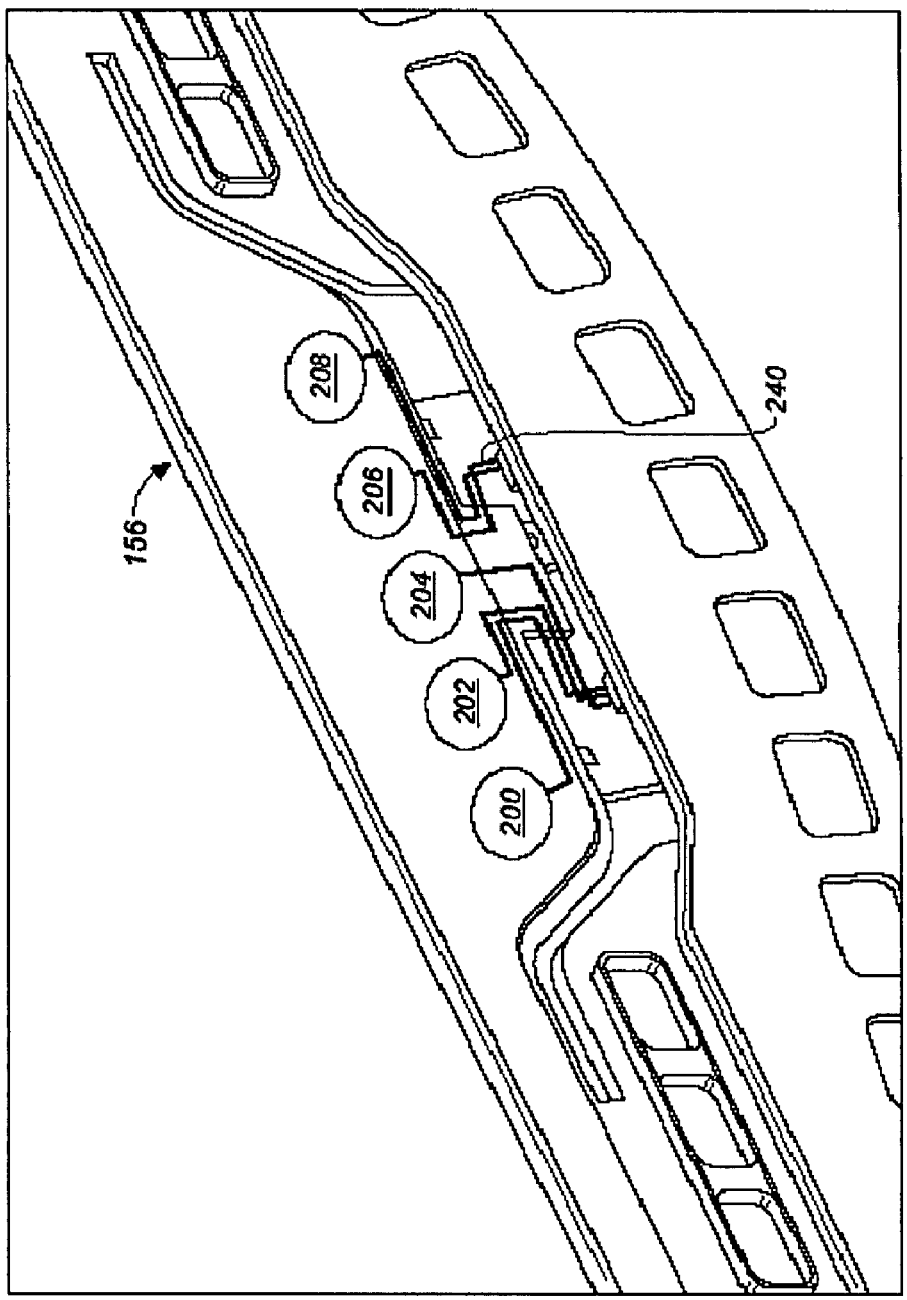
FIG. 4A illustrates one embodiment of a plurality of touch sensitive areas associated with a switch.

FIG. 4A shows one embodiment of switch bar 156, in which each of the touch zones 1-5 has a separate touch sensitive area, labeled 200, 202, 204, 206 and 208. Of course, the touch sensitive areas can be any shape and are not limited to those shown in FIG. 4A. Similarly, there can be more or fewer touch zones as well. Keybar 156 is defined by an elongate slot 157 in the uppercase of the keyboard. The narrower the slot, the more increase in electrostatic discharge protection is achieved between the capacitive sensing portions 200-208 and the electrometrical switch that is activated by paddle 166.

In the embodiment shown in FIG. 4A, each of the touch sensitive areas 200-208 are capacitive areas that can be placed on the material of switch bar 156 using any desirable means. For instance, where the material of keybar 156 is opaque, the touch sensitive areas 200-208 can be placed on a material of keybar 156 using ink transfer printing or other methods. Also, where the material of keybar 156 is transparent or semi-transparent, it may be desirable to hide the touch sensitive areas 200-208. In that case, the touch sensitive areas 200-208 can be formed using in-mold decorating, or ink transfer printing with clear conductive ink. Those portions could also be formed, for example, using materials and techniques known by those skilled in the art, such as indium tin oxide (which is a deposition and chemical etching process that deposits a clear deposition on a clear film and is almost completely transparent (transparent being approximately 95 percent light transmissive).

It can be seen that each of the touch sensitive areas 200-208 can illustratively be connected to a connector 240 by electrically conductive traces, which can be formed in the same way as touch sensitive areas 200-208, or in different ways.

These can be formed using any desired trace technology along with film insert molding, in-mold labeling, or other technologies. The connector can be any type of known connector, such as a conventional header, a ZIF connector, a pressure form to Mylar connection, a metal spring to printed circuit board connection, Mylar traces, etc. In any case, the traces and connector connect the touch sensitive areas 200-208 to the printed circuit board 114 which contains the electrical circuitry for the keyboard 102. It can thus be seen that by using the multiple touch sensitive zones 200-208 on a single keybar 156, the processing circuitry can distinguish among activation of the various touch sensitive zones based on a combination of the user touching one of the touch sensitive zones and depressing the electromechanical switch placed to detect depression of keybar 156. In this way, keybar 156 basically acts as five different and separate keys, but utilizing only a single electromechanical switch.

Of course, the savings associated with a reduced number of switches can be realized until the number of switches corresponds to the number of touch zones. For instance, FIG. 4A shows that five touch zones are associated with a single switch. There could be six touch zones associated with a single switch, or a smaller number or larger number of touch zones sharing a switch. There may be two sets of three touch zones, each set sharing a switch, or three sets of two touch zones, each set sharing a switch. Of course, any desired number of touch zones can share a switch as well.

FIGS. 4B-1 and 4B-2 shows another example of switch bar 156. FIG. 4B-2 is a cross-sectional view of the area of bar 156 in the region of paddle 166, taken along section line 4B-2-4B-2 in FIG. 4B-1. The items shown in FIGS. 4B-1 and 4B-2 shows schematically how they are similar to those shown in FIG. 4A, except that FIG. 4B shows schematically how the switch actuator paddle 166 of FIG. 4A is covered by a lower portion 260 of the uppercase, or separate part, and hidden from the user's sight. The switch that resides beneath actuator paddle 166 is also hidden. The switch is shown at 262, and the portion of actuator paddle 166 that is hidden by the portion 260 of the upper base is shown in FIG. 4B-2 and is shown in phantom in FIG. 4B-1 as well.

It will also be noted, of course, that, where the actuator paddle 166 is hidden beneath the portion 260 of the uppercase material, the portion 260 may be opaque, so that switch 262 is hidden from view, while the remainder of keybar 156 can be transparent. This configuration can be used, even without capacitive sensors 200-208, in the event that transparent material may be desired for keybar 156, while still hiding the switching mechanism.

FIG. 4B-1 also shows an optional illumination source 300. While illumination source 300 is described with respect to the arrangement of keybar 156 shown in FIG. 4B-1, it could be used with any other arrangements described herein as well. Illumination source 300 enables a user interaction model in which user contact with any of the touch sensitive areas 200-208 cause illumination source 300 to illuminate the region of the touch sensitive area 200-208 that is currently being activated (or touched) by the user. The illumination source 300 could be located in a variety of locations, depending on what lighting effect is desired, and what illumination technology is used.

For instance, where a plurality of touch sensitive zones 200-208 are associated with a single keybar 156 and an electromechanical switch 262, it may be difficult, depending on how closely the touch sensitive areas are spaced, or depending on how large the fingers of the user are, for the user to determine which touch sensitive area is currently being activated by the user's touch. In accordance with the embodiment being described, illumination source 300 can be substantially any lighting accomplished by any desired illumination techniques, such as light emitting diodes (LEDs), lasers, electroluminescence (EL), and optical elements such as light pipes, lenses, mirrors, etc.). Illumination can provide desired feedback to the user regarding what area of the keyboard is currently being touched or pressed. Illumination source 300 illuminates the specific touch sensitive area(s) 200-208 being activated. In other embodiments, source 300 can illuminate the entire keybar 156, other zones on the keyboard surface or even the entire rim 150.

In one embodiment, illumination source 300 includes plurality of LEDs, hidden beneath an opaque portion of the uppercase of the keyboard. Light pipes are also used to direct light, when the corresponding LED is illuminated, to the desired touch sensitive area. In this way, when the user places his or her finger over touch sensitive area 200, for example, a light will illuminate the area underneath or surrounding, the user's finger, so the user can easily determine that he or she is actually touching the desired touch sensitive area.

Figure 4C:
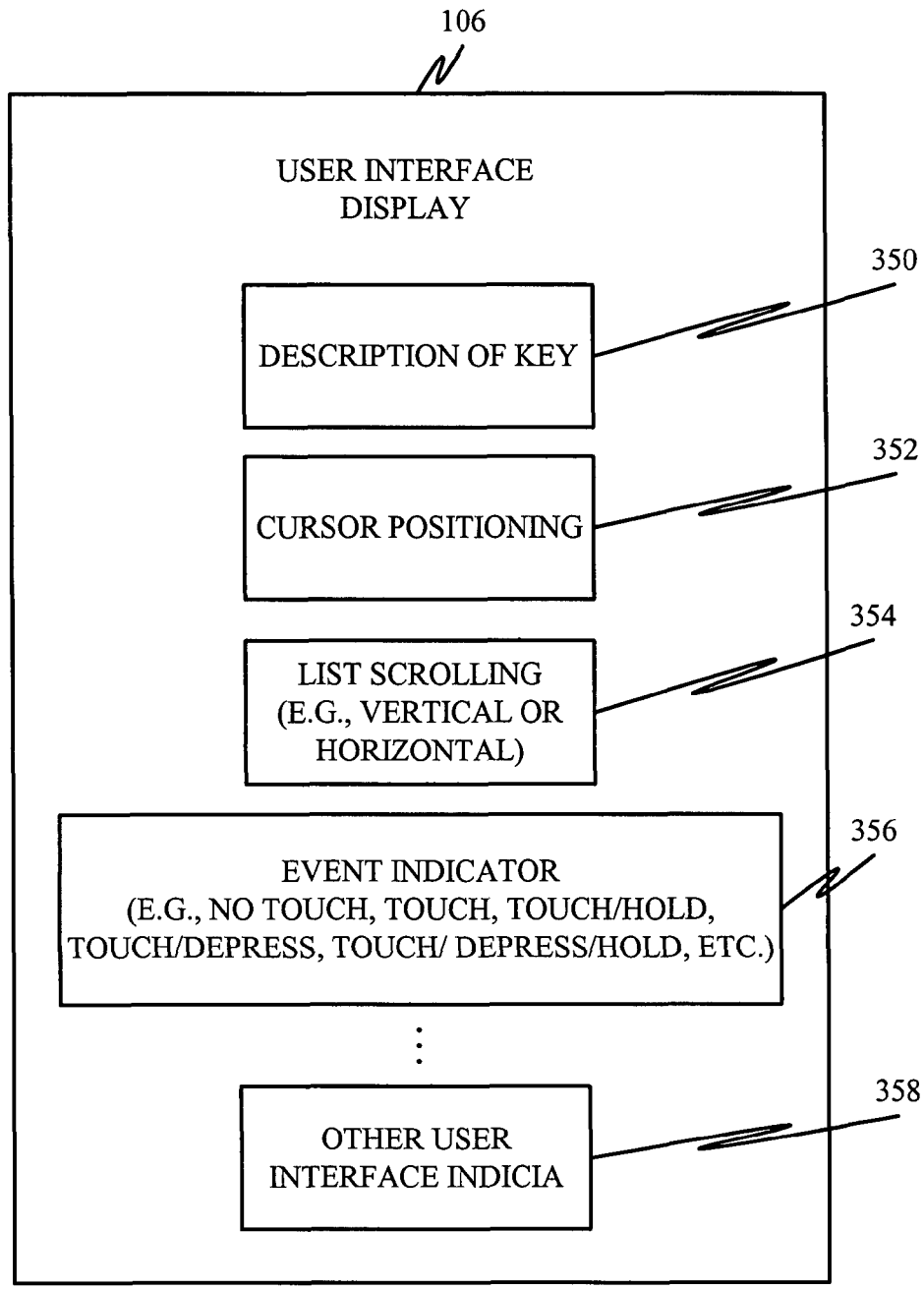
FIG. 4C illustrates a user interface display in accordance with a plurality of different embodiments.

FIG. 4C shows one embodiment of a user interface display 106, generated by computer 104, which helps to explain a number of user interaction models. In one embodiment, when the user activates one of the touch sensitive areas 200-208 by placing a finger on it (or otherwise touching it), the computer 104 generates a heads-up display on the display device 106. The heads-up display illustratively describes the function of the key which the user has touched. This description of the key as indicated by block 350 in FIG. 4C. For instance, where touch sensitive areas 200-208 are all assigned different functions, it may be difficult for the user to remember the particular functions assigned to each key given the current context within which the user is working. Therefore, by simply touching the touch sensitive area 200-208 of keybar 156, computer 104 may illustratively generate a small heads-up display message on display 106 describing the function associated with the key that the user is touching. This can help to verify, for the user, that the user is about to make a proper selection.

In accordance with another user interaction model, computer 104 can generate substantially any heads-up display based on the user touching any touch sensitive area on keyboard 102. For instance, the touch sensitive areas 200-208 may control cursor positioning of the cursor on display 106. In that case, when the user gestures in any direction (such as moves his or her finger from one sensitive area to another) the heads-up display being generated (e.g., the cursor) moves in a corresponding direction on display 106. Performing cursor positioning, or other heads-up display positioning) based on the user touching the touch sensitive area is indicated by block 352 in FIG. 4C.

FIG. 4C also shows an embodiment of another user interaction model. For instance, if the user moves his or her finger from one touch sensitive area to another, this can cause computer 104 to perform other operations on display 106. For instance, as the user moves his or her finger among the various touch sensitive areas 200-208, computer 104 may cause display 106 to modify the selected object of an object oriented list or any other object oriented type of interface displaying an array of objects, or scroll through lengthy content obscured below the fold of the visible region of any window. List scrolling (in either vertical or horizontal directions, or both) is indicated by block 354 in FIG. 4C.

FIG. 4C also shows another embodiment of a user interaction model. The heads-up display generated by computer 104 based on the user activating a touch sensitive area can be an event indicator that indicates to the user what event the user is engaging in, or is about to engage in. The heads-up display can indicate events corresponding to a user not touching any touch sensitive area, a user merely touching a touch sensitive area, a user touching and holding a touch sensitive area, a user touching and depressing the switch corresponding to the touch sensitive area, or the user touching, depressing a switch, and holding the switch depressed. Different operations on the display 106 can be performed based on any of these events, or other events, such as double clicking, double clicking and holding, variance pressure sensing, sensing proximity to the region before touching (i.e., hovering), touching/sliding back and forth etc. This type of touching activity event indicator is indicated by block 356 in FIG. 4C.

Of course, computer 104 can generate any other desired user interface indicia as well. Those described above are exemplary only and the other user interface indicia are indicated by block 358 in FIG. 4C. For instance, when display 106 is shown, horizontal or vertical finger movement can cause the heads-up display to progressively disclose additional interface functionality or detailed information.

Figure 4D:
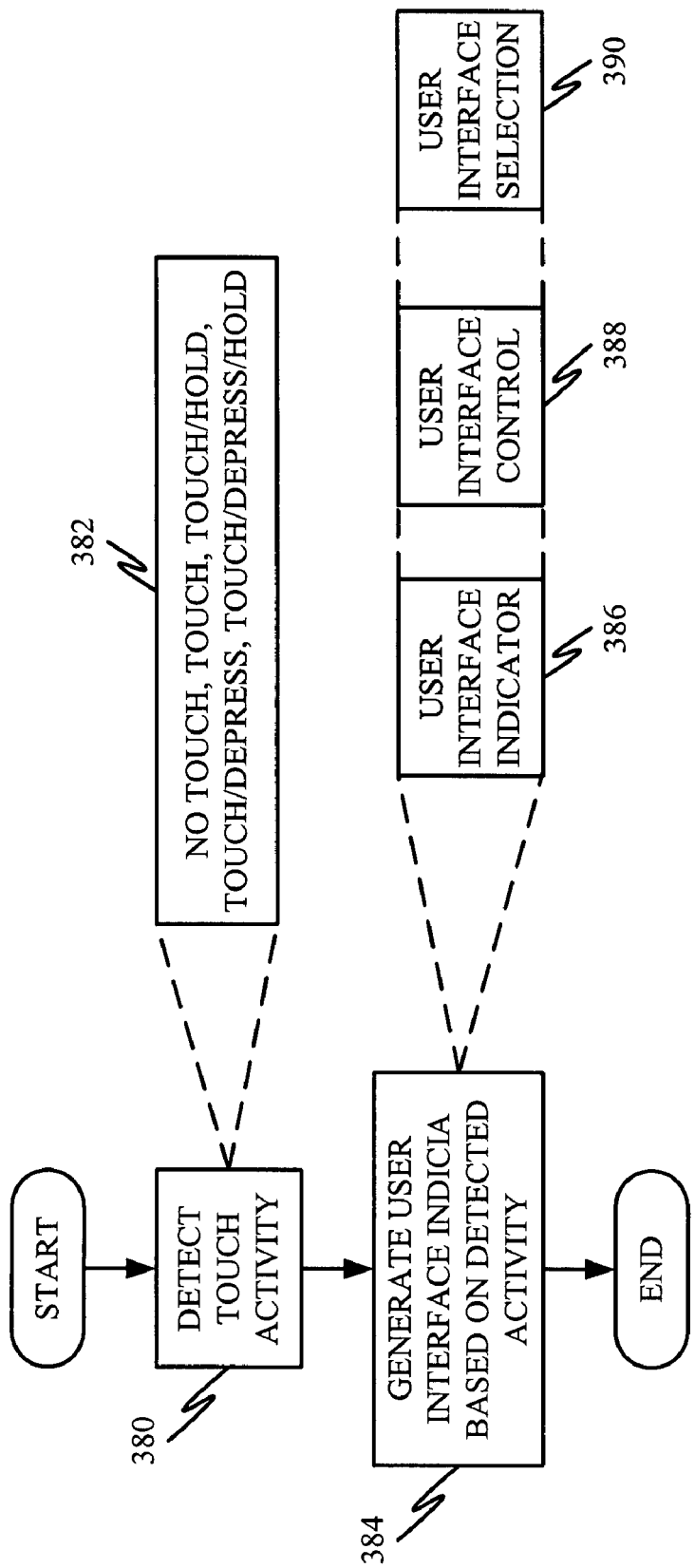
FIG. 4D is a flow diagram illustrating the operation of the keyboard and user interface interaction in accordance with one embodiment.

FIG. 4D is a flow diagram illustrating one embodiment of the operation of computer 104 in conjunction with a user interacting with keyboard 102. In one embodiment, touch sensors 116 detect touch activity of the user. This is indicated by block 380 in FIG. 4D. As described with respect to FIG. 4C, the touch activity can be no touch, touch, touch and hold, touch and depress, or touch/depress/and hold, or other activity. This is indicated by block 382 in FIG. 4D.

The computer 104 then generates user interface indicia based on the detected activity. This is indicated by block 384 in FIG. 4D. Some of the user interface indicia are simply user interface indicators 386 that simply describe the activity detected. Other indicia include user interface control indicia, such as controlling navigation, list scrolling, cursor positioning, etc. This is indicated by block 388 in FIG. 4D. Still other user interface selection indicia are shown at block 390. These indicia show that the user has actually made a selection, such as by depressing the switch associated with the touch sensitive area that the user is touching. Of course other indicia can be generated, or other user interaction models can be used as well, and those discussed are exemplary only.

Figure 5:
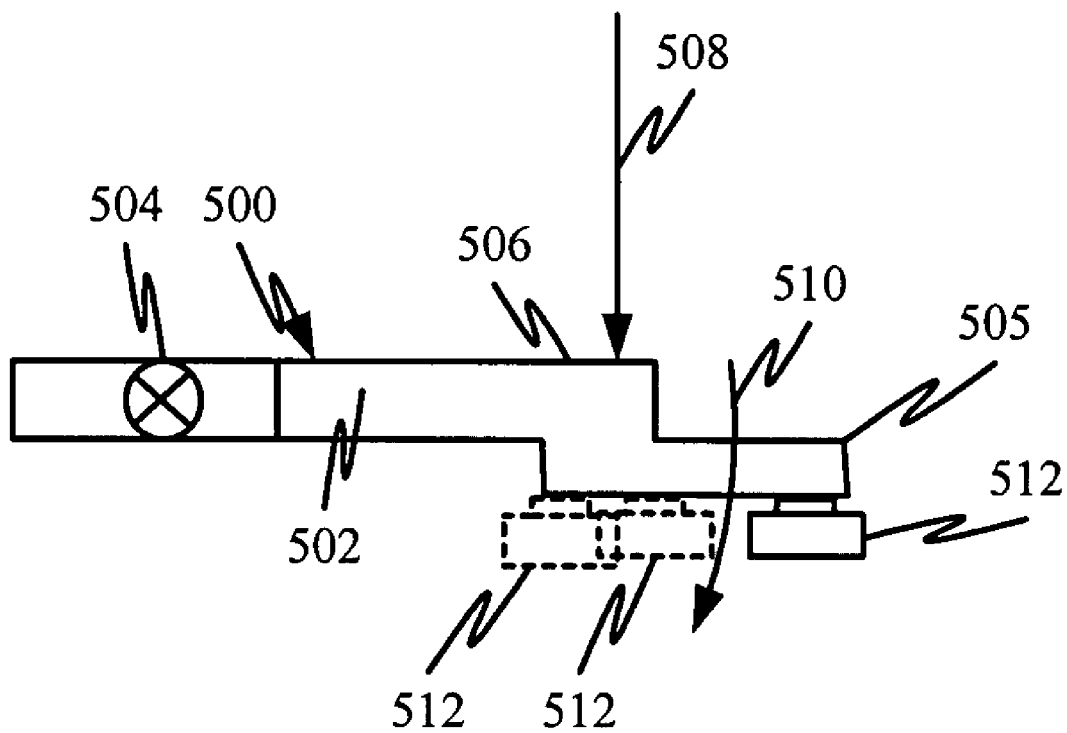
FIG. 5 is a schematic view of one embodiment of a cantilevered beam key.

FIG. 5 is a side schematic view illustrating one embodiment of a mechanical configuration of a keybar, or other key in accordance with one embodiment. In the embodiment shown in FIG. 5, the key 500 includes a keybar 502 that forms a cantilevered beam extending from a pivot point, or axis of rotation 504, about which keybar 502 pivots. Pivoting and rotation or rotates will simply be referred to as pivoting or pivots hereinafter.

In the embodiment shown, the cantilevered beam 502 has an offset switch activator paddle 505, which is offset from a force receiving surface 506 of keybar 502. In other words, during operation, a user illustratively applies force in the direction indicated by arrow 508 on surface 506 of keybar 502. This causes keybar 502 to pivot downwardly about pivot point 504. This downward pivoting, in the direction indicated by arrow 510, causes switch activator paddle 505 to depress travel switch 512. Switch 512 then illustratively generates a signal indicating that it has been depressed. It can be seen that, in general, switch 512 is not required to be aligned with the direction of applied force 508. Instead, it can be offset from that direction. In fact, it is offset from the force receiving portion 506 of keybar 502. In this way, the force receiving portion 506 of keybar 502 can be transparent, but switch 512 can be hidden under an opaque portion of the keyboard so that it is not directly visible through the transparent portion of keybar 502.

FIG. 5 shows that the applied force receiving portion 506 of keybar 502 is located between switch 512 and pivot point 504. Alternatively, of course, switch 512 could be located between the force receiving portion 506 of keybar 502 and the pivot point 504. Switch 512 is shown in phantom in FIG. 5 to indicate this position, and to indicate the position in which it is aligned with the force receiving portion. In this latter embodiment, of course, the force receiving portion 506 of keybar 502 can also be transparent, and the portion of keybar 502 directly above switch 512 can be opaque, in order to hide switch 512 from the user's visibility. Of course, other configurations, other than those shown in FIG. 5, can be used as well. The load applied by the user could be anywhere relative to pivot point 504 and switch 512.

Figure 6:
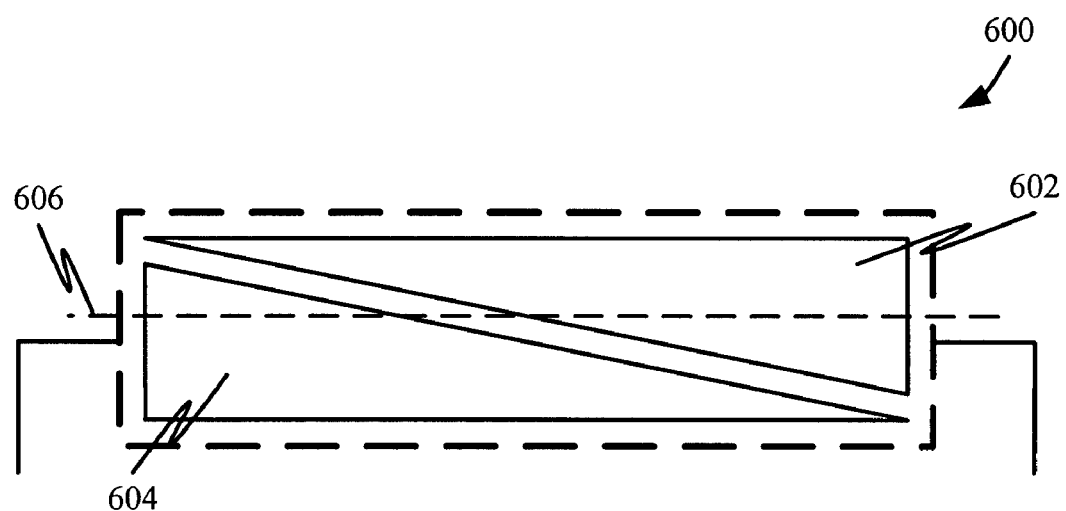
FIG. 6 is a schematic view in which absolute or relative position is sensed on a touch sensitive area.

FIG. 6 shows one illustrative layout 600 of two different touch sensitive areas 602 and 604. The touch sensitive areas 602 and 604, as with touch sensitive areas 200-208, are illustratively conductive areas that form a capacitance area sensing architecture with variable resolution. In other words, the capacitance associated with areas 602 and 604 will vary based on how much of those areas are covered by the user's finger. If the user covers a relatively small portion of areas 602 or 604, the capacitance associated with the user touching that portion will be smaller than if the user touches a relatively larger portion of areas 602 or 604. For example, if the user covers a relatively small portion of area 602 while covering a larger portion of area 604, the resulting difference is capacitance compared to the capacitance in its untouched state for area 602 will be smaller than the capacitance difference for area 604 compared to its untouched state. Therefore, if the user places his or her finger over a portion of both areas 602 and 604, the processing circuitry on keyboard 102, or computer 104, can determine the approximate location of the user's finger along a generally longitudinal axis 606 corresponding to the pair of sensing areas 602 and 604, based on the relative magnitudes of the signals associated with areas 602 and 604. Similarly, as the user moves his or her finger in either direction along the longitudinal axis 606, the change in the user's finger location can be determined as well. This can be very helpful, for instance, when computer 104 is implementing a user interaction model which allows the user to scroll through lists, perform navigation, perform cursor positioning, etc., all of which can be implemented by detecting movement of the user's finger that is touching the touch sensitive areas.

It will be appreciated, of course, that while the user's finger position can be detected continuously as it travels along longitudinal axis 606, it may be desirable to perform a more discrete position detection as well. In other words, the capacitive areas 602 and 604 which reside along longitudinal axis 606 can be broken into discrete areas. The user's finger position can be tracked as it moves from one discrete area to the next, although continuous positioning may not be tracked. Of course, different techniques for tracking the user's finger position can be used and those described are illustrative only.

Figure 7:
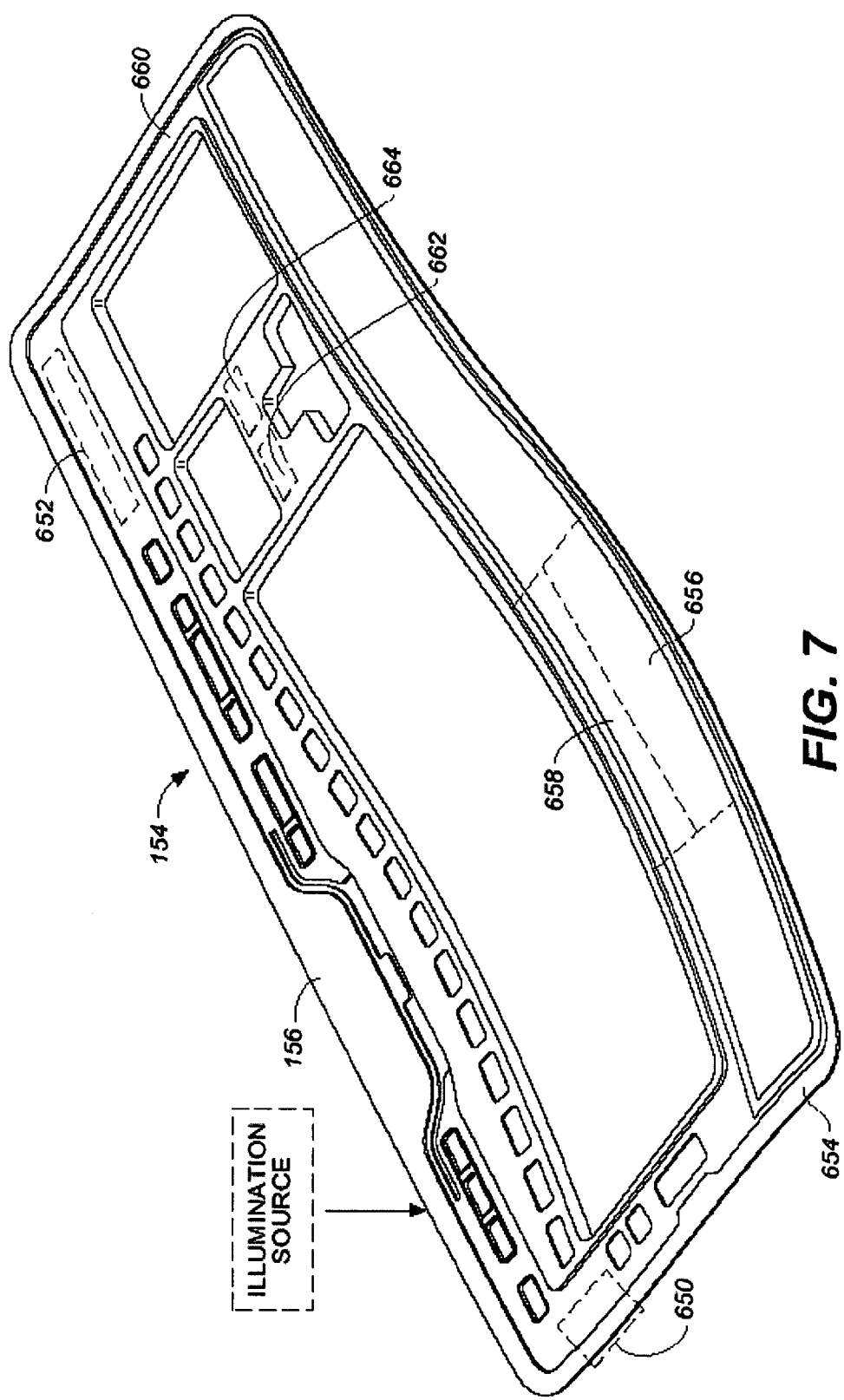
FIG. 7 illustrates one embodiment of a touch sensitive upper case of a computer keyboard, in accordance with one embodiment.

FIG. 7 shows one pictorial illustration of the uppercase 154 of keyboard 102. It can be seen that the uppercase 154 defines a number of apertures through which various conventional keyboard keys protrude when uppercase 154 is assembled onto keyboard 102. FIG. 7 illustrates, however, that substantially any portion of the uppercase 154 can have touch sensitive regions disposed thereon. By way of example only, FIG. 7 shows that uppercase 154 can have touch sensitive areas 650 and 652 in the upper corners, respectively, and areas 654, 656, and 658 on the lower portion of uppercase 154, and touch sensitive area 660, which is on a side of uppercase 154 opposite touch sensitive area 650. Similarly, touch sensitive areas 662 and 664 are located on a structural area within the interior of uppercase 154. These touch sensitive areas can be any size and shape, can all be configured to be depressible and interact with an electromechanical (or other) switch, or they can simply be touch sensitive areas through which the user can engage in any desired user interaction behavior with computer 104, simply by touching the various areas shown.

Also, of course, each of the areas shown in FIG. 7 can be divided into multiple different areas as well. Other or different touch sensitive areas can be used as well. Similarly, the entire rim can be touch sensitive.

FIG. 7 also shows that the entire uppercase 154 can be associated with an illumination source, such as the illumination source 300 described above with respect to FIG. 4B. In other words, illumination source 300 can include a plurality of LEDs each positioned below a corresponding touch sensitive area, or positioned away from the corresponding touch sensitive area, with light pipes (or other optics) directing light from the LEDs to the corresponding touch sensitive areas. Therefore, as the user touches the touch sensitive areas, those areas can be illuminated, or a heads-up display can be generated describing the functions that can be performed by touching those areas, or both, or different illumination patterns or heads-up displays can be generated as well.

Similarly, the illumination source can generate different types of illumination based upon the touch activity being detected. In other words, different illumination, or illumination patterns can be generated when the user is not touching any touch sensitive area, when the user is touching an area, touching and holding an area, touching and depressing a switch associated with an area, or touching depressing and holding the switch in a depressed state, etc. In one embodiment, the illumination corresponding to no touch is present at all times. When a physical touch is detected, lighting can change, such as becoming more intense, indicating user contact with that touch sensitive area. When touch is detected for a longer period of time (touch and hold), the lighting can change to something different, such as perhaps blinking, and a heads-up display can be provided on screen as well. When a switch depression event follows a touch, the illumination may change again, indicating perhaps that the user is committing to a certain action, and also a heads-up display can be generated indicating perhaps that the user is committing to a certain action. Finally, when a touch, depress and hold event occurs, the lighting can change yet again to indicate something unique, such as the assignment of an action to that key, etc.

Figure 8:
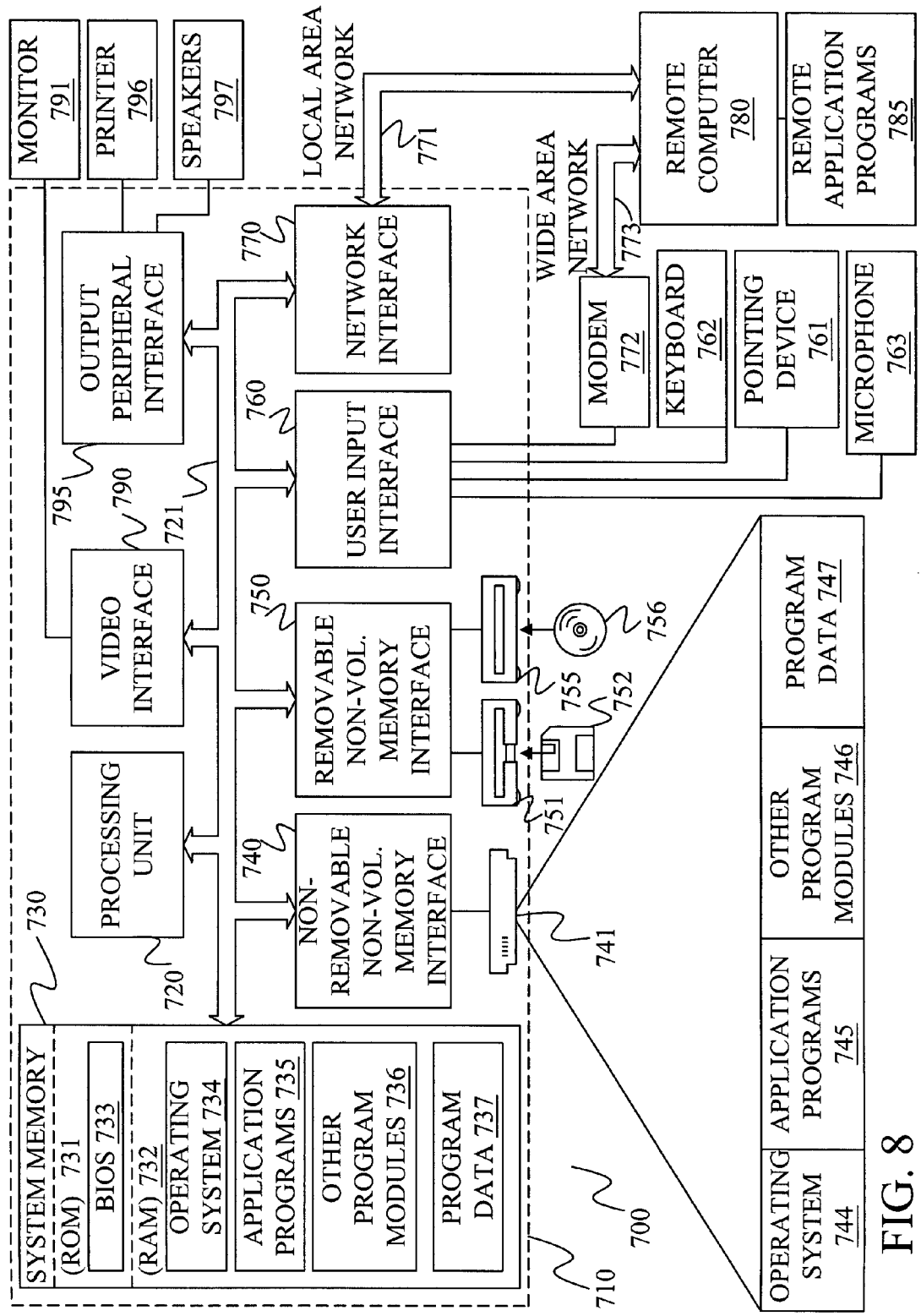
FIG. 8 is a block diagram of one illustrative computing environment in which the keyboard can be used.

FIG. 8 illustrates an example of a suitable computing system environment 700 on which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held devices (such as phones, PDAs, media devices, storage devices, etc.) or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 710 (which may be computer 104 in FIG. 1). Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 8 illustrates operating system 734, application programs 735, other program modules 736, and program data 737.

The computer 710 may also include other removable/non-removable volatile/nonvolatile computer storage media. By way of example only, FIG. 8 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 8, provide storage of computer readable instructions, data structures, program modules and other data for the computer 710. In FIG. 8, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762 (which may be keyboard 102 in FIG. 1), a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 8 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 8 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A keyboard, comprising:
   a keybar including a cantilevered beam portion extending from a pivot portion and having a plurality of keys formed thereon, the cantilevered beam portion having a force receiving portion configured to receive a force applied on a first side of the cantilevered beam portion in a direction to rotate the cantilevered beam portion about the pivot point to move the keybar from a non-actuated position to an actuated position;
   a touch sensing portion disposed on the force receiving portion, the touch sensing portion being configured to detect a touch input on each key of the plurality of keys regardless of whether the keybar is moved to the actuated position;
   a switch arranged relative to the keybar to detect movement of the keybar between the non-actuated position and the actuated position, the switch being displaced from the pivot portion and disposed on a second side of the cantilevered beam portion that is opposite the first side of the cantilevered beam portion; and
   processing circuitry configured to detect a press input on the keybar, the processing circuitry being configured to determine which key of the plurality of keys received the press input based on a combination of a first input from the touch sensing portion and a second input from the switch indicating movement of the keybar to the actuated position.

2. The keyboard of claim 1, wherein the switch is disposed between the force receiving portion and the pivot portion.

3. The keyboard of claim 1 wherein the force receiving portion is disposed between the pivot portion and the switch.

4. The keyboard of claim 1 wherein the keybar and touch sensing portion are formed of substantially transparent material.

5. The keyboard of claim 1 and further comprising:
   an illumination source providing illumination of the touch sensing portion when the touch sensing portion is touched.

6. The keyboard of claim 1 and further comprising:
   a plurality of keybars, each having a plurality of touch sensing portions disposed thereon, each keybar having a corresponding switch detecting depression of the corresponding keybar.

7. The keyboard of claim 1 and further comprising a top case having a structural portion, wherein the cantilevered beam portion is defined by a slot in the structural portion of the top case, the cantilevered beam portion being depressible by deforming the structural portion of the top case.

8. The keyboard of claim 1 and further comprising a top case wherein the cantilevered beam portion includes a switch activation paddle portion protruding from the cantilevered beam portion and arranged to activate the switch upon depression of the cantilevered beam portion.

9. The keyboard of claim 8 wherein the switch activation paddle portion is offset from the touch sensing portions and extends to a position overlapped by an overlapping portion of the top case, such that the switch is also overlapped by the overlapping portion of the top case.

10. The keyboard of claim 1 wherein the touch sensing portion is formed of a variable resolution activation area that provides a signal indicative of a position of a touching member within the touch sensing portion.

11. A keyboard system, comprising:
    an integral upper case having structural portions and at least one opening, the structural portions of the upper case comprising a first portion and a pivotable cantilevered beam portion integrally formed with and extending from the first portion of the upper case, the cantilevered beam portion being pivotable about a pivot point by deforming the structural portions of the upper case;
    a plurality of keys extending through the at least one opening defined by the upper case; and
    a touch sensing area including at least one touch sensor positioned on a first side of the pivotable cantilevered beam portion, the at least one touch sensor being configured to sense touching of the touch sensing area; and
    a switch positioned to detect pivotal movement of the pivotable cantilevered beam portion about the pivot point.

12. The keyboard system of claim 11 and further comprising:
    a user display, displaying an indication of touch activity based on touching of the touch sensing areas.

13. The keyboard system of claim 11 and further comprising:
    an illumination system generating illumination of the structural portions of the upper case based on touching activity sensed by the touch sensors.

14. The keyboard system of claim 13 and further comprising:
    a computer generating a user interface display, in addition to the illumination generated by the illumination system, the user interface display being based on the touching activity sensed by the touch sensors.

15. The keyboard system of claim 11 wherein the switch is disposed on a second side of the pivotable cantilevered beam portion opposite the first side of the pivotable cantilevered beam portion on which the at least one touch sensor is positioned.

16. The keyboard system of claim 11, wherein top surfaces of the first portion and the cantilevered beam portion are substantially aligned.

17. A keyboard comprising:
    an upper case having structural portions and defining openings therein, the structural portions comprising a first portion and a cantilevered beam portion extending from the first portion, the cantilevered beam portion being pivotable about a pivot point between the first portion and the cantilevered beam portion by deforming the structural portions of the upper case, the cantilevered beam portion having one or more keys disposed thereon, each key comprising:
    a force receiving portion configured to receive a force applied to a first side of the cantilevered beam portion in a first direction to move the key from a non-actuated position to an actuated position about a pivot portion; and
    a touch sensing portion disposed on the force receiving portion and configured to detect touching of the touch sensing portion, regardless of whether the key is moved to the actuated position; and
    a switch arranged on a second side of the cantilevered beam portion opposite the first side, the switch being configured to detect movement of each of the one or more keys between the non-actuated position and the actuated position, the switch being displaced from the pivot portion.

18. The keyboard of claim 17 and further comprising:
a plurality of depressible members, each respective depressible member having a plurality of keys disposed thereon and a corresponding switch configured to detect depression of the plurality of keys disposed on the respective depressible member.

19. The keyboard of claim 17, wherein processing circuitry is configured to distinguish among user activation of each key of the plurality of keys as a function of both input from the touch sensing portion of the key and input from the switch indicating movement of the depressible member.

* * * * *